United States Patent
Grabarnik et al.

(10) Patent No.: US 10,217,153 B2
(45) Date of Patent: Feb. 26, 2019

(54) ISSUE RESOLUTION UTILIZING FEATURE MAPPING

(71) Applicants: INTERNATIONAL BUSINESS MACHINES CORPORATION, Armonk, NY (US); ST. JOHN'S UNIVERSITY, NEW YORK, Queens, NY (US); THE FLORIDA INT'L UNIVERSITY BOARD OF TRUSTEES, Miami, FL (US)

(72) Inventors: Genady Grabarnik, Queens, NY (US); Tao Li, Miami, FL (US); Larisa Shwartz, Scarsdale, NY (US); Wubai Zhou, Yorktown Heights, NY (US)

(73) Assignees: INTERNATIONAL BUSINESS MACHINES CORPORATION, Armonk, NY (US); ST. JOHN'S UNIVERSITY, Queens, NY (US); THE FLORIDA INTERNATIONAL UNIVERSITY, Miami, FL (US)

( * ) Notice: Subject to any disclaimer, the term of this patent is extended or adjusted under 35 U.S.C. 154(b) by 142 days.

(21) Appl. No.: 15/196,171

(22) Filed: Jun. 29, 2016

(65) Prior Publication Data
US 2018/0005286 A1     Jan. 4, 2018

(51) Int. Cl.
*G06Q 30/00*   (2012.01)
*G06Q 30/06*   (2012.01)
*G06F 17/30*   (2006.01)

(52) U.S. Cl.
CPC ... *G06Q 30/0613* (2013.01); *G06F 17/30551* (2013.01)

(58) Field of Classification Search
None
See application file for complete search history.

(56) References Cited

U.S. PATENT DOCUMENTS

| | | | |
|---|---|---|---|
| 9,086,960 B2* | 7/2015 | Mahindru | G06F 11/07 |
| 9,229,800 B2* | 1/2016 | Jain | G06Q 30/01 |
| 9,436,758 B1* | 9/2016 | Lewis | G06F 17/30654 |
| 9,524,475 B1* | 12/2016 | Cmielowski | G06N 99/005 |
| 2009/0063387 A1* | 3/2009 | Beaty | G06N 5/04 706/50 |
| 2012/0066547 A1* | 3/2012 | Gilbert | H04L 41/065 714/26 |
| 2014/0081953 A1* | 3/2014 | Ingram | G06Q 10/10 707/722 |

(Continued)

OTHER PUBLICATIONS

J Blitzer et al., "Domain Adaptation with Structural Correspondence Learning", Proceedings of the 2006 Conference on Empirical Methods in Natural Language Processing (EMNLP 2006), pp. 120-128.

(Continued)

*Primary Examiner* — Mila Airapetian
(74) *Attorney, Agent, or Firm* — Cantor Colburn LLP

(57) ABSTRACT

A method for providing a resolution to an open issue is described. The method includes utilizing structured corresponding learning to determine pivots from a database having historical data records to determine data records having similar open issues and providing their resolution. The method further includes providing a recommended resolution for the open issue based on the historical data records.

12 Claims, 4 Drawing Sheets

(56) References Cited

U.S. PATENT DOCUMENTS

2014/0244816 A1* 8/2014 Anerousis ............ H04L 41/065
                                                    709/223
2017/0140315 A1* 5/2017 Cao ................. G06Q 10/06311

OTHER PUBLICATIONS

J. Blitzer et al., "Biographies, Bollywood, Boom-boxes and Blenders: Domain Adaptation for Sentiment Classification", ACL, vol. 7, 2007, pp. 440-447.

R Ando et al., "A Framework for Learning Predictive Structures from Multiple Tasks and Unlabeled Data", Journal of Machine Learning Research 6, 2005, pp. 1817-1853.

Genady Grabarnik et al., "Issue Resolution Utilizing Feature Mapping", Related Application, U.S. Appl. No. 16/142,294, filed Sep. 26, 2018.

List of IBM Patents or Patent Applications Treated As Related; (Appendix P), Filed Sep. 27, 2018; 2 pages.

* cited by examiner

ISSUE RESOLUTION UTILIZING FEATURE MAPPING

BACKGROUND

The present invention relates in general to computer systems, and more specifically to systems, method and computer program products for resolving issues that arise in connection with computer systems.

Issues regarding the operation of computer systems are constantly developing. Such issues may be with respect to general queries that require an answer or tickets reflecting conditions that require attention by the system or system administrator in order to address the issue.

SUMMARY

In accordance with one or more embodiments, a computer-implemented method for providing a resolution includes providing, using a processing system, an original request having a criteria and requiring resolution. A database having a plurality of request records is accessed using the processing system. Each request record includes a request component and a resolution component. The processing system separates the database into a source domain and a target domain, the source domain comprising request records created prior to a predetermined time period, the target domain comprising request records created after the predetermined time period. The processing system analyzes the request records of the source domain and target domain to establish a combined request domain including data records having related requests and resolutions. The analysis includes utilizing structured correspondence learning to define pivots which are utilized to determine data records having related requests and resolutions. The processing system analyzes the original request and compares the original request to data records of the combined request domain to determine similar data records and related resolutions. A resolution is recommended for resolving the request of the original ticket.

In one or more embodiments of the invention, a system for providing a resolution for a computer system ticket includes a memory and a processing system communicatively coupled to the memory. The memory is configured to store a plurality of ticket records each having a symptom component and a resolution component. The processing system is configured to divide the ticket records into a source domain and a target domain, and wherein the processing system utilizes structural correspondence learning to identify pivots associated with the ticket records for determining related ticket records based on either the symptom or resolution component and associating the related tickets in a common ticket database. The processing system is also configured to analyze an original ticket record having a symptom and recommend a resolution based on a comparison with ticket records included in the common ticket database wherein a ticket record in the common ticket database has a symptom related to the symptom of the original ticket record and the recommended resolution is the resolution component of the ticket record in the common ticket database.

In accordance with one or more embodiments, a computer program product for providing a resolution for a ticket is provided. The computer program product comprises a computer readable storage medium having program instructions embodied therewith, wherein the computer readable storage medium is not a transitory signal per se, the program instructions readable by a processing circuit to cause the processing circuit to perform a method. The method includes providing, using a processing circuit, an original ticket having a symptom requiring resolution. A historical ticket database having a plurality of ticket each including a symptom component and a resolution component is accessed using a processing circuit. The processing circuit separates the database into a source domain and a target domain, the source domain comprising ticket records created prior to a predetermined time period, the target domain comprising ticket records created after the predetermined time period. The processing circuit analyzes the ticket records of the source domain and target domain to establish a combined request domain including ticket records having related symptoms and resolutions, the analysis including utilizing structured corresponding learning to define pivots which are utilized to determine ticket records having related requests and resolutions. The processing circuit analyzes the original ticket and compares the original ticket to ticket records of the combined request domain to determine similar ticket records and related resolutions; and a resolution recommendation is provided for resolving the request of the original ticket.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
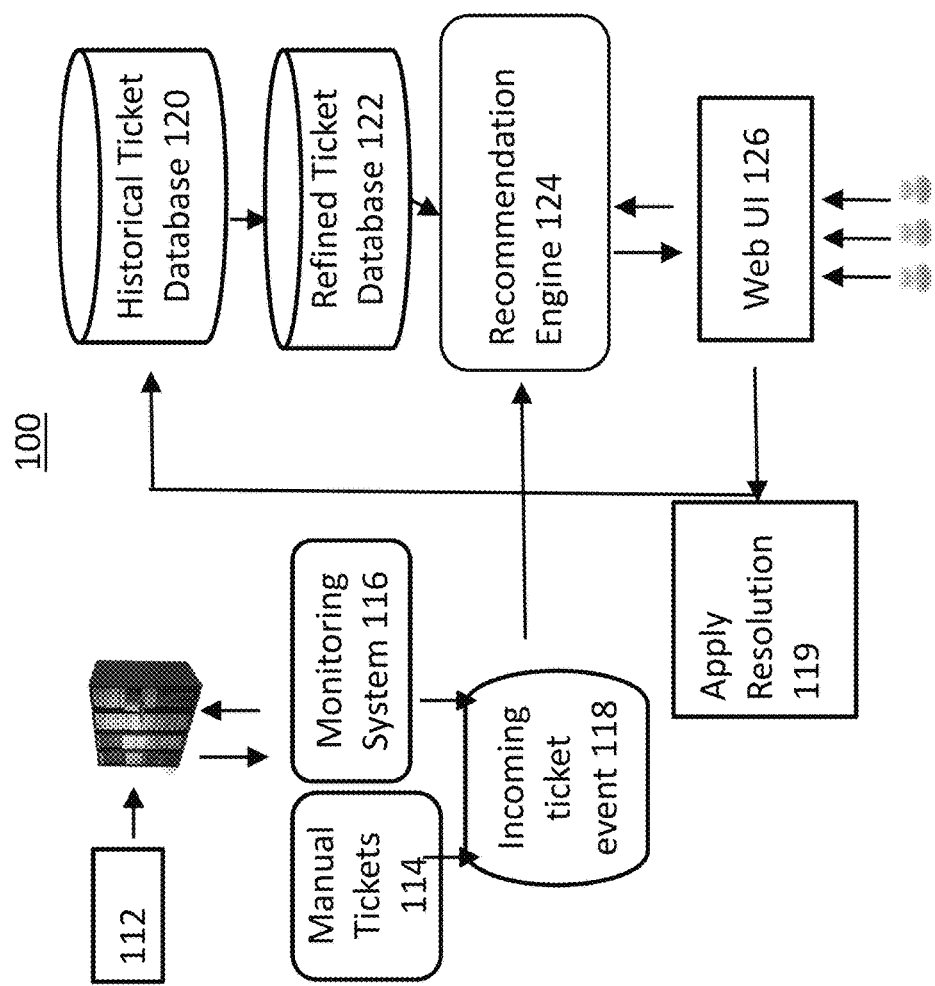
FIG. 1 shows a system overview according to one or more embodiments.

One or more embodiments of the present invention present an issue resolution system which utilizes historical data records for providing resolution of a newly created original issue. Embodiments of the invention allow for a system to utilize historical records which may not be semantically equivalent but relate to the same subject matter. Embodiments of the invention further allow the system to utilize corresponding historical resolutions to resolve more recent issues.

In particular, embodiments of the invention are directed to resolving outstanding tickets related to the operation of a computer system or program. IT service providers have rapidly introduced automation to their service delivery model. Reduction of cost and quality of service has required that outstanding tickets be resolved through automated service delivery. This is largely achieved through service providing facilities integrated with system management tools in combination with automation of routine maintenance procedures such as problem detection, determination and resolution for the service infrastructure. Automatic problem detection is typically realized by system monitoring software such as IBM Tivoli Monitoring Software. Monitoring continuously captures the events and generates incident tickets when alerts are raised. Deployment of monitoring solutions is a first step towards fully automated delivery of a service.

In an automated service infrastructure monitoring system event tickets are generated. The typical workflow of problem detection, determination, and resolution in services infrastructure management is prescribed by the Information Technology Infrastructure Library specification. Problem detection is usually provided by monitoring software, which computes metrics for hardware and software performance at regular intervals. The metrics are then matched against acceptable thresholds. A violation induces an alert. If the violation persists beyond a specified period, the monitor emits an event. Events from the entre service infrastructure are accumulated in an enterprise console that uses rule or knowledge based engines to analyze the monitoring events and decide whether to open an incident ticket in the ticketing system. The incident tickets created from the monitoring events are called monitoring tickets. Additional tickets are created upon customer request through a so-called "service management system." The information accumulated in the ticket is used by technical support for problem determination and resolution. Embodiments of the invention are directed to tickets generated by the monitoring system. Additionally, embodiments of the invention may be utilized to resolve open issues of any type.

Each monitoring ticket is stored as a database record that consists of several related attributes with values describing the system status at the time when the monitoring event was generated. For example, a CPU-related ticket usually contains the CPU utilization and paging utilization information. A capacity related ticket usually contains the disk naiad the size of disk used/free pace. Typically, different types of monitoring events have different sets of related attributes. The resolution of every ticket is stored as a textual description of steps taken by the system administrator for resolution.

As system operations typically involve consistent operations, tickets generated with common resolutions frequently occur. A dilemma arises in service environments which utilize massive heterogeneous applications, as well as various monitoring software running on customers' servers to accomplish complex tasks and to monitor system health via different metrics, as over time correlated tickets are generated that have different symptom descriptions but similar resolutions. This arises as services are upgraded, environments change and different vocabularies are utilized in generating the tickets. Accordingly, the historical records may not be semantically equivalent to more current data records while being relevant in providing historical resolutions which may be relevant to the symptom of the current original ticket being issued.

Embodiments of the invention develop mappings between resolutions and initial tickets notwithstanding that the tickets may be created utilizing different vocabularies over time. The embodiments utilize structural correspondence learning (SCL). An example of utilizing SCL involves utilizing a dataset of historical tickets which is utilized for determining an appropriate resolution for an incoming event or ticket. While resolutions for the same root cause may slightly differ, due to system enhancements and such, descriptions of the symptoms which caused the creation of the ticket could vary significantly. For example, two tickets have the same resolution as "archive the logs and thus reduce the space utilization," but their descriptions could be different when diverse vocabularies are used, such as "volume," "capacity" or "harddiskvolume". While "volume," "capacity" and "harddiskvolume" are literally distinct, they have high correlation with "space" or "utilization" in the historical data set enabling construction of mapping between them and recommending similar resolutions for incoming events represented by different vocabulary.

The mapping is constructed utilizing various steps. Initially, the ticket database is divided into two or more distinct domains based on predetermined time windows. Source tickets are defined as the tickets from the first time window and target domain tickets are the tickets from the second time window. The structured corresponding learning first identifies a set of m pivot features that occur frequently in both domains. Next, the structured corresponding learning models the correlation between the pivot features and all other features by training pivot predictors t predict the occurrences of each pivot feature in all ticket datasets from both domains. The coefficients of the l-th pivot feature; positive coefficients indicate that a non-pivot feature is highly correlated with the corresponding pivot feature. The coefficients of each pivot predicator is considered as a column vector. All predictors are arranged into a matrix $W=[wl]_{nl=1}$ where $w_l$ is the lth column coefficient vector and n is the number of pivot features. $\theta \in R^{h \times d}$ is set to be the top h left singular vectors of W, i.e.

$$[UDV^T]=SVD(W), \theta=U^T[1:h,:]$$

These vectors are the principal predictors for the coefficient space and establishing pivots. Establishing pivots is essential for SCL to operate properly. The invention identifies pivot features which identify appropriate resolutions for the tickets. Identifying pivot features utilizes the calculation of term frequency-inverse document frequency (TD-IDF) scores for all words out of ticket symptom description in both time domains and choose a thousand words having the highest TF-IDF scores for each domain. After the TF-IDF scores are calculated, the m most frequently occurring words out of the two sets of a thousand words are chosen. This approach provides strong indicators of "symptoms" or "system issues requiring resolution". The next step requires determining pivot features from ticket resolutions. An example of identifying pivot features is shown in the following table:

| Symptom | Resolution |
| --- | --- |
| App space job high restore status error procedures fail | Incident close copy resolve server found issue action team job clear close file |

The pivot features chosen from the symptom strongly describes the ticket symptom observed on the server system. The pivot features chosen by resolution describe the ticket resolution, i.e., how to resolve issues on the server system. From each pivot feature a determination is made if a particular pivot feature occurs in the ticket requiring to be resolved utilizing m linear predicators. A linear regression model with $l_2$ regularization as the underlying classification model:

$$f_l(x)=sgn(w_l x), l=1, \ldots, n$$

The following table summarizes the details the construction of predicators given by the prior equation:

| | |
|---|---|
| Sign (.) | Does pivot feature 1 occur in the resolution of this ticket |
| Pivot feature | The m most frequently occurring words shared in the two domains of 100 words having the top T-IDF scores in ticket resolutions in both domains |
| X | 1000 words having the highest TF-IDF scores from symptom description |
| Training data | All tickets attached with resolution from both domains |

Pivot predicators are very important when utilizing Structured Corresponding Learning. The weight vectors $w_l$ encode the covariance of the no-pivot features with the pivot features. If the weight given to the z-th feature of the l-th pivot predicator is positive, then the feature z is positively correlated with pivot feature l. Since pivot features strongly indicate resolution, non-pivot features from both domains will also be correlated with them. If two non-pivot features are correlated in the same way with many of the same pivot features, then there is a high degree of correspondence.

Embodiments of the invention utilizing structural correspondence learning and pivots were tested on various ticket domains and respective resolutions. A project matrix θ was established identifying respective words which could be pivots. The following table illustrates the first row of θ. The features on each row appear only in the corresponding domain. The features indicate event tickets caused by the same or similar root cause and thus share similar resolution.

| | |
|---|---|
| +s | Sdump bee idc ami sr included refer read processing queues page reas- response |
| +t | Readresponse getacctsummbycustid contingency cli logerror harddiskvolume paging traps getacctsforgrantee ant |
| −s | Messages wtprocess normal wiptriger ifscmonitor poa responding cumpcode acctinfo |
| −t | Batjbstrom sm fndstn xmx bm aclv throw responsestream |

From the table, certain correspondence feature groups appear. Notation "s" corresponds to features coming from the source domain, and "t" corresponds to features coming from the target domain. The + and − symbols indicate positive and negative features in correspondences. Certain correspondence groups were identifiable. For example sdump, page, harddiskvolume, paging, traps" indicate system issues in or similar to paging due to low capacity. Sdump is an executable command that tries to dump virtual storage and thus makes space for paging. Without feature mapping, tickets will be considered having low or no similarity if they contain discriminant features. With feature mapping, discriminant features can be projected to shared feature space by applying them to $θ_x$. The features will ensure that their corresponding even tickets have higher similarity. Applying structural correspondence language to both the source and target labeled tickets enables resolution recommendations to be applied.

Referring to FIG. 1, computer system 100 includes processors 112 which may include servers. The processors or servers operate to perform various operational processes or functions. From the operation if certain performance issues develop a manual ticket 114 may be generated. Additionally, the system may include an autonomous operational monitoring system 116 which monitors the various operational functions of the system and generate tickets if certain performance issues develop. Additionally, monitoring system may be utilized to monitor incoming activities such as a query and generate a corresponding action request to solve the query. In the illustration as shown, an incoming ticket 118 is generated in response to operation of the processor or servers 112 which requires resolution. To provide a resolution, system 100 includes a historical ticket database 120. Historical ticket database includes a plurality of pre-existing ticket records which include an original symptom component and a resolution component. The ticket records are evaluated and some may be removed for various reasons such as being an erroneous ticket or the like. The remaining ticket records are stored in a refined ticket database 122. A recommendation engine 124 is utilized for applying the structural correspondence learning processing with the tickets and developing the corresponding pivots for ascertaining the relevant tickets and corresponding resolutions. From the recommendation engine, the appropriate resolution is recommended to a user utilizing a web user interface 126, or the system automatically performs the required resolution.

Figure 2:
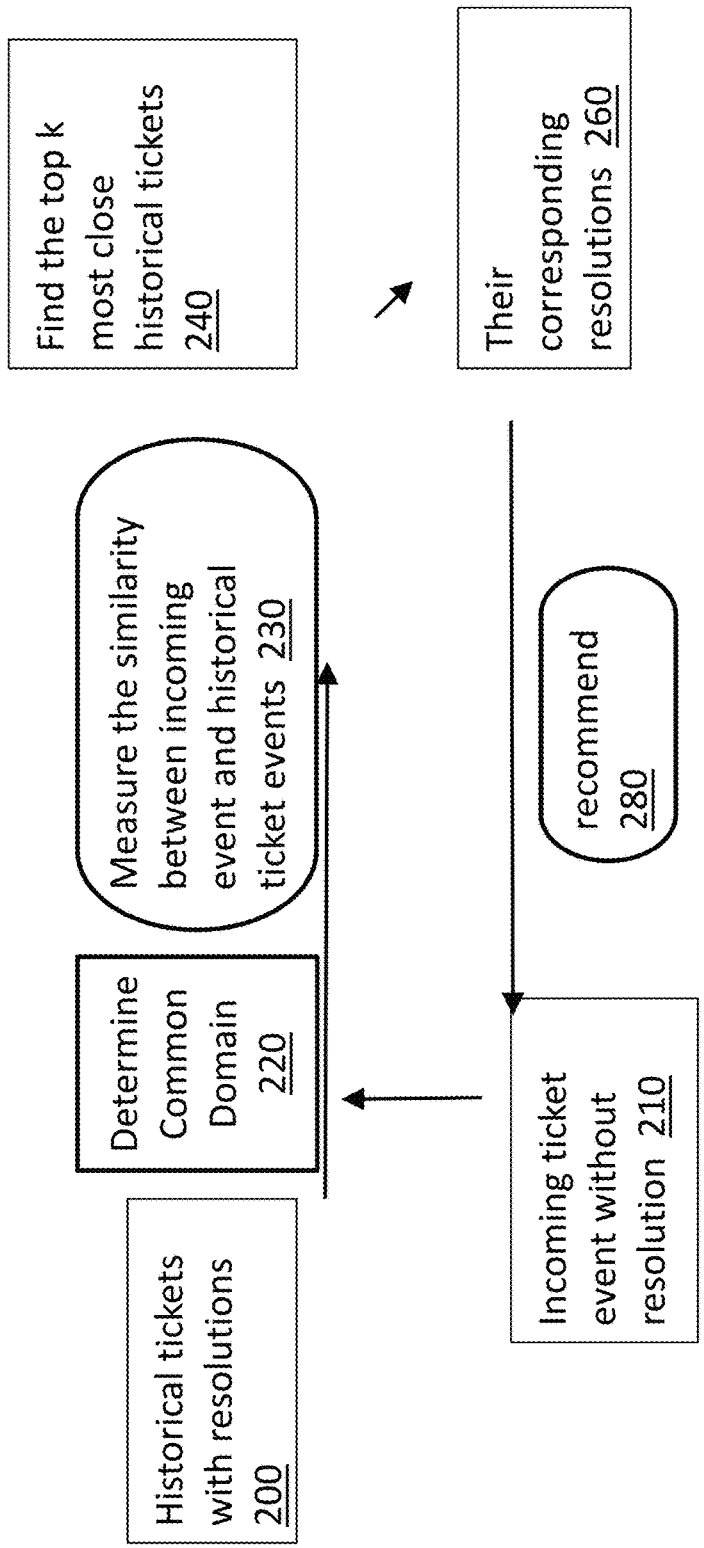
FIG. 2 is flow chart illustrating one example of an issue resolution system for practice of the teachings herein.

Referring to FIG. 2, a method for recommending a ticket resolution is disclosed. At block 200, the respective historical tickets and their corresponding resolutions are identified. At block 210, an incoming ticket without a resolution is produced. At block 220, a common domain utilizing structural correspondence learning and pivots is established. At block 230, the symptom of the incoming ticket is compared to the historical tickets created at block 220. From the comparison step at block 230, those historical tickets which appear the most closely related to the incoming ticket are identified and at block 260 the corresponding resolutions are identified. The most relevant resolutions are recommended at block 280 either automatically by the system or to a system operator.

Figure 3:
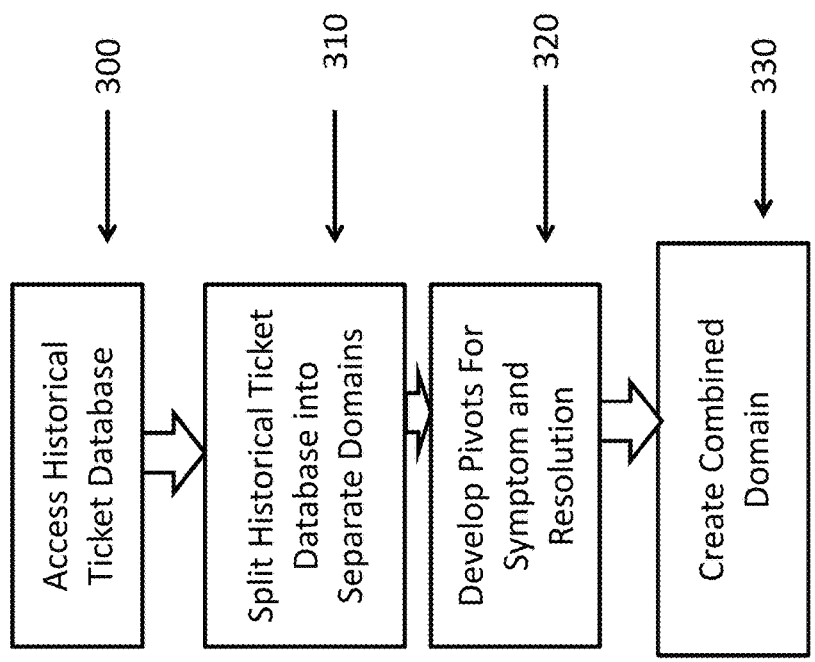
FIG. 3 shows a flow chart illustrating the combination of a source and target database for practice of the teachings herein.

Referring to FIG. 3, the development of the combined domain of historical tickets and resolutions is illustrated. Initially at step 300, the historical ticket database is accessed. The historical ticket database includes prior ticket records which include their symptom or issue and related resolution. With the advent of system upgrades and other changes, the various semantic of the symptoms or resolution may evolve. To identify tickets and resolutions which are equivalent but semantically changed due to the passage of time the historical ticket database is split into separate domains. The first domain is the source domain and the second domain is the target domain. The bifurcation is conducted utilizing respective timeframes. Of course the domains may be split into multiple domains providing different reference points. For each source domain structural correspondence learning is utilized to develop pivots for both the respective symptoms or issues and resolutions. By utilizing pivots for both components, a larger universe of related tickets is identified as the resolutions may apply to different unrelated symptoms. Concurrently with the development of pivots in the source domains, pivots are developed in the target domain for both the symptoms and resolutions. The target domain consists of the most current tickets and resolution which should correspond closer to the newly created original ticket. To extend the historical coverage of tickets of the target domain, the pivots of the source domain with respect to both the symptoms and resolutions are compared with the pivots of the target domain. From this comparison older tickets which correspond to the newer tickets are combined to create the combined domain. In essence, the target domain is utilized as a bridge to establish the relevancy of older tickets and their corresponding resolutions to the newer nomenclature utilized in the newly created ticket by utilizing the presumed newer nomenclature of the target domain as a Rosetta stone for establishing the relevancy of the older tickets in possibly providing solutions to the newly generated ticket. With the establishment of the combined domain, the symptom of the new ticket is compared to the symptoms of the historical tickets in steps 230 and 240 of FIG. 2.

Figure 4:
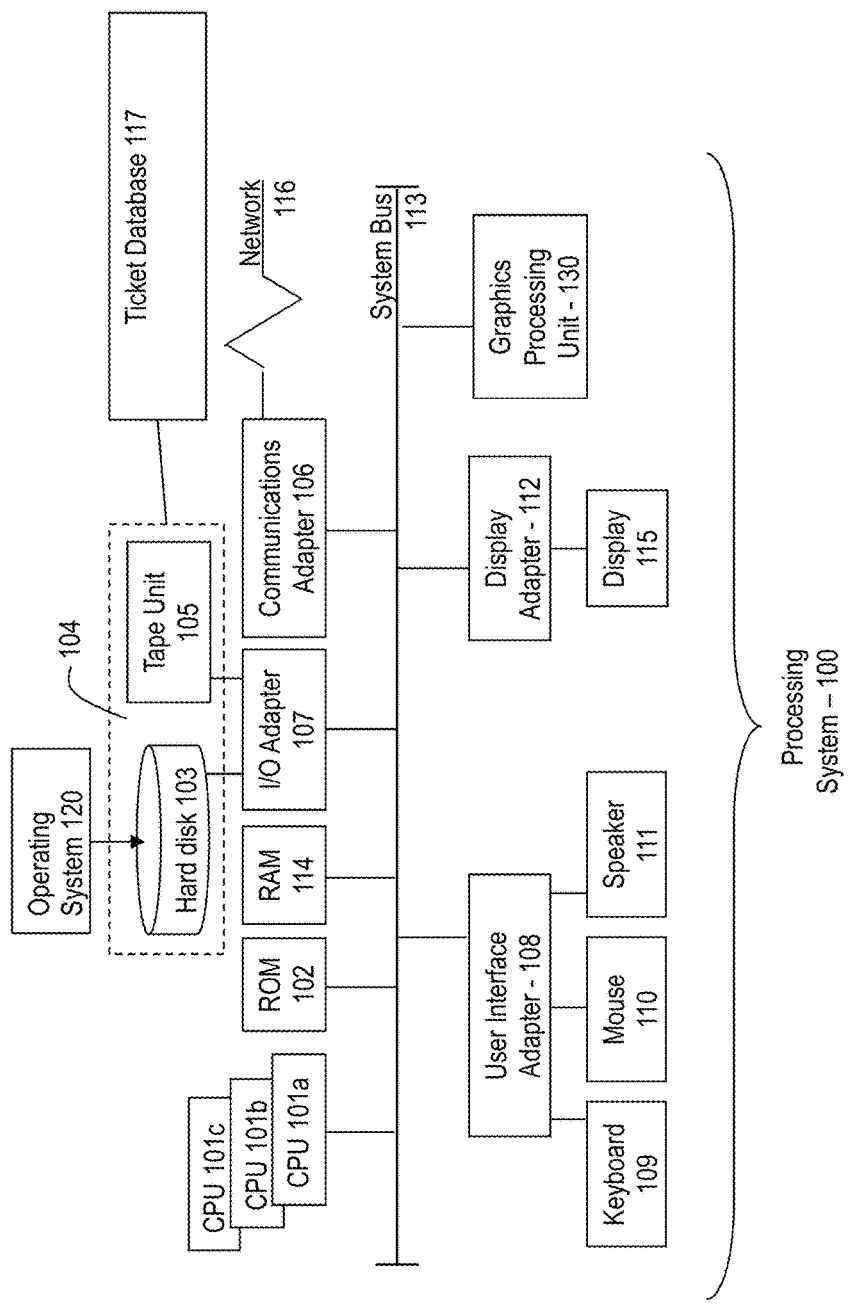
FIG. 4 shows a system overview according to one or more embodiments.

FIG. 4 illustrates computer system 100 according to one or more embodiments. The system 100 has one or more central processing units (processors) 101*a*, 101*b*, 101*c*, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 4 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit. A ticket database 117 contains historical ticket records which include their respective symptom and resolution.

Thus, as configured in FIG. 4, the computer system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components shown in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing a resolution, the method comprising:
    providing, using a processing system, an original request having a criteria and requiring resolution;
    accessing, using a processing system, a database having a plurality of request records each including a request component and a resolution component;
    separating, using the processing system, the database into a source domain and a target domain, the source domain comprising request records created prior to a predetermined time period, the target domain comprising request records created after the predetermined time period;
    analyzing, using the processing system, the request records of the source domain and target domain to establish a combined request domain including data records having related requests and resolutions, the analysis including utilizing structured corresponding learning to define pivots which are utilized to determine data records having related requests and resolutions;
    analyzing, using the processing system, the original request and comparing the original request to data records of the combined request domain to determine similar data records and related resolutions; and
    providing a resolution recommendation for resolving the request of the original ticket.

2. The computer-implemented method of claim 1, wherein the request is generated using a processing system and is an original ticket having a symptom created in response to an operational condition of a computer system, the original ticket requiring resolution.

3. The computer-implemented method of claim 2, wherein a ticket database is accessed using a processing system and the ticket database includes a plurality of operational ticket records each including a symptom component and a resolution component.

4. The computer-implemented method of claim 3, wherein the ticket database is separated into a source ticket domain and a target domain, the source ticket domain comprising tickets created prior to a predetermined time period, the target ticket domain comprising tickets created after the predetermined time period.

5. The computer-implemented method of claim 4 including analyzing, using the processing system, the ticket records of the source domain and target domain to establish a combined ticket domain including ticket records having related symptoms and resolutions, the analysis including utilizing structural correspondence learning to define pivots which are utilized to determine tickets having related symptoms and resolutions; and analyzing, using the processing system, the original ticket and comparing the original ticket to ticket records of the combined ticket domain to determine similar ticket records and related resolutions; and providing a resolution recommendation for resolving the symptom of the original ticket.

6. The computer-implemented method of claim 1, wherein structural correspondence learning is utilized to define pivots for request in both the target and source domain.

7. The computer-implemented method of claim 6 further including utilizing structural correspondence learning to define pivots for the resolution component of the data records.

8. A computer program product for providing a resolution for a ticket, the computer program product comprising a computer readable storage medium having program instructions embodied therewith, wherein the computer readable storage medium is not a transitory signal per se, the program instructions readable by a processing circuit to cause the processing circuit to perform a method comprising:
    providing an original ticket having a symptom requiring resolution;
    accessing a historical ticket database having a plurality of ticket each including a symptom component and a resolution component;
    separating the database into a source domain and a target domain, the source domain comprising ticket records created prior to a predetermined time period, the target domain comprising ticket records created after the predetermined time period;
    analyzing the ticket records of the source domain and target domain to establish a combined request domain including ticket records having related symptoms and resolutions, the analysis including utilizing structural correspondence learning to define pivots which are utilized to determine ticket records having related requests and resolutions;

analyzing the original ticket and comparing the original ticket to ticket records of the combined request domain to determine similar ticket records and related resolutions; and providing a resolution recommendation for resolving the request of the original ticket.

9. The computer program product of claim 8 further including utilizing structural correspondence learning to determine pivots for both the symptom and resolution component of the ticket records.

10. The computer program product of claim 9 further including applying term frequency-inverse document frequency to the ticket symptoms of both the source and target domain and selecting a predetermined amount of words having the highest term-frequency-inverse document frequency scores for each domain.

11. The computer program product of claim 9, wherein the processing circuit applies the recommended action for resolving the symptom of the original ticket.

12. The computer program product of claim 9, wherein a display displays the recommended action to an end user.

* * * * *